Figure 1:
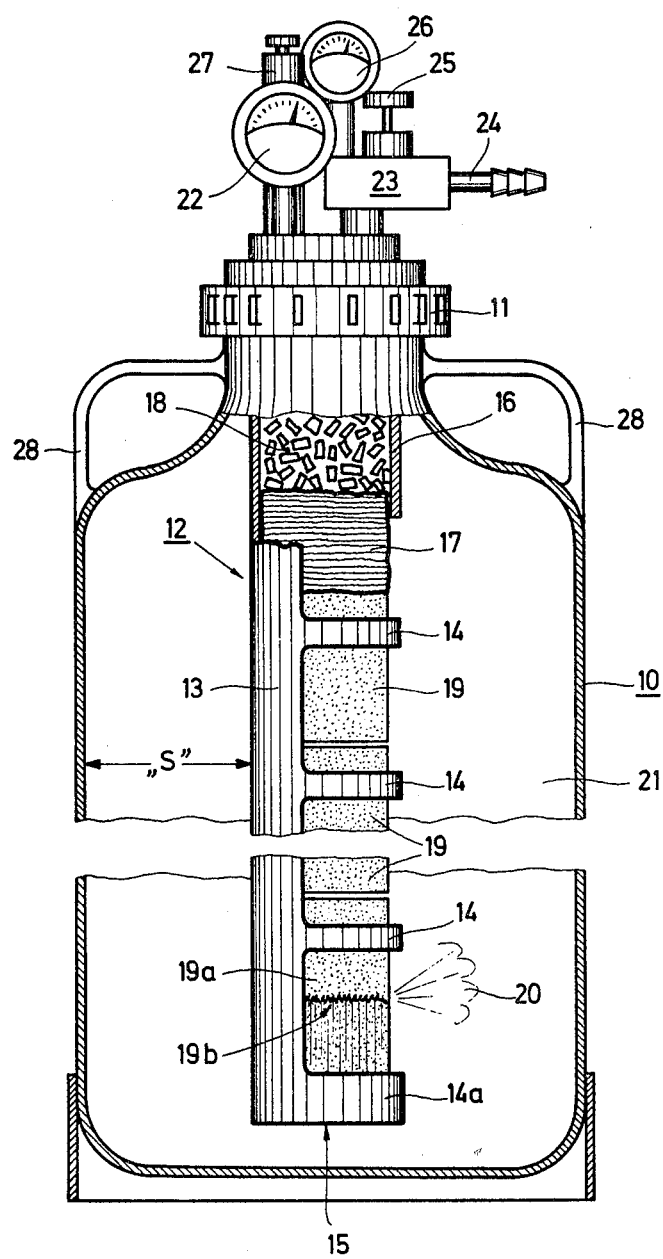

United States Patent [19]

Rothenberger

[11] 4,111,661

[45] Sep. 5, 1978

[54] OXYGEN GENERATOR WITH CARTRIDGE HOLDER FOR OXYGEN-YIELDING CARTRIDGES

[75] Inventor: Günther Rothenberger, Bad Homburg von der Hohe, Fed. Rep. of Germany

[73] Assignee: Rothenberger GmbH Werkzeuge und Maschinen KG, Frankfurter, Fed. Rep. of Germany

[21] Appl. No.: 751,612

[22] Filed: Dec. 16, 1976

Related U.S. Application Data

[63] Continuation of Ser. No. 643,582, Dec. 22, 1975, abandoned.

[30] Foreign Application Priority Data

Dec. 27, 1974 [DE] Fed. Rep. of Germany ....... 2461681

[51] Int. Cl.² ........................ B01J 7/00; C01B 13/00
[52] U.S. Cl. ................................. 422/117; 214/17 B; 214/18 R; 422/119; 422/165; 422/232

[58] Field of Search ............... 23/281; 128/203; 214/17 B

[56] References Cited

U.S. PATENT DOCUMENTS

| 3,385,672 | 5/1968 | McGoff et al. | 23/281 |
| 3,436,191 | 4/1969 | McGoff et al. | 23/281 |
| 3,573,001 | 3/1971 | Bovard | 23/281 |
| 3,737,287 | 6/1973 | Churchill et al. | 23/281 |
| 3,756,435 | 9/1973 | Steigerwald | 214/17 B |
| 3,756,785 | 9/1973 | Nettleland | 23/281 |

*Primary Examiner*—Joseph Scovronek
*Attorney, Agent, or Firm*—Burgess, Dinklage & Sprung

[57] ABSTRACT

An oxygen generator for welding, cutting and brazing work includes a gas-tight container and a cartridge holder for cartridges giving off oxygen when burned. The gas-tight container is constructed as a pressure tank and envelops the cartridge holder in such a way so as to leave a storage volume which is capable of accommodating the amount of oxygen given off by burning at least one cartridge without exceeding the pressure limits of the pressure tank.

5 Claims, 2 Drawing Figures

OXYGEN GENERATOR WITH CARTRIDGE HOLDER FOR OXYGEN-YIELDING CARTRIDGES

This is a continuation of application Ser. No. 643,582, filed Dec. 22, 1975, now abandoned.

BACKGROUND

The invention relates to an oxygen generator, preferably for welding, cutting and brazing operations, consisting of a gas-tight container and a cartridge holder insertable therein to accommodate combustible cartridges which yield oxygen in the burning state. Such a device can also be referred to as a "reactor".

In the state of the art is an oxygen generator of the above-described kind, in which the gas-tight container envelops the cartridge holder without any appreciable clearance. The cartridge holder is charged with at least one commercially available, oxygen-yielding cartridge which is provided on its one end with an igniting composition which can be ignited on the striking surface of a matchbox. The cartridge holder has at its extremity outside of the container a filter for pulverulent by-products of the combustion process, as well as a chamber to accommodate a drying agent which absorbs the water vapor released upon combustion. The chamber for the drying agent leads to a connection for a hose leading to the burner for the welding, cutting and brazing operations. Such oxygen generators are combined with a bottle containing a combustible gas such as propane or butane, which is equipped with a regulating valve leading to an additional hose which is also connected to the burner. A set of such equipment is sold principally for hobby work.

In the known apparatus, the oxygen released flows within the container through the filter and the drying agent and to the burner nozzle without appreciable pressure. Regulation of the flow of oxygen by devices on then apparatus is not possible. The consumption of oxygen is determined exclusively by the burning characteristics of the cartridges, which for this purpose are offered in a variety of types. It is possible to stop the liberation of the oxygen only by removing the cartridge holder from the container and removing the burning portion of the cartridge, for example by cutting it off. The unburned remainder of the cartridge can still be used if it is re-ignited, but this is made inconvenient by the fact that there is no longer an igniting composition on the remainder of the cartridge. As a rule, therefore, the cartridge is allowed to burn to the end, so that if the work is finished before it is completely consumed, the result is a considerable waste of cartridges. Control of the flame is possible only by varying the adjustment of the valve on the propane or butane bottle.

In the known apparatus, the gas-tight container becomes hot due to its closeness to the cartridge holder and the burning cartridge, so that a heat-resistant surface protection of the container becomes necessary, by means, for example, of an expensive electroplating process. Nevertheless, discoloration of the surface-protective coating or the blistering of the coating material cannot always be prevented. On account of the high temperature in the container, the released oxygen furthermore passes through the filter and the drying material in a very hot state, entraining moisture and heat. An excessive amount of moisture, which is absorbed by the cartridge if improperly stored, for example, is unable to condense due to the high gas temperatures, and is carried into the burner. Consequently the burner flame tends occasionally to become extinguished, and this is a nuisance. The heat content of the oxygen also appreciably shortens the life of the hose. The burner nozzles of the known apparatus are of special design on account of the low gas pressure, and they have to be adapted to each particular size of cartridge and cartridge characteristic on account of the lack of control of the oxygen flow. Consequently there are a number of obstacles to the use of the known apparatus for industrial purposes, in factories and on construction sites, for example.

On construction sites, therefore, the large and heavy high-pressure oxygen bottles having internal pressure of up to 200 atmospheres are used, although they are expensive to obtain and difficult to transport.

It is consequently impractical to carry them up ladders and scaffolds.

THE INVENTION

The invention, therefore, is addressed to the problem of improving the initially described oxygen generator such that the oxygen produced will be under an appreciable pressure, the oxygen-yielding cartridges will be able to burn to the end without waste, and the oxygen generator will be ready for immediate operation at any time after work is interrupted before the released oxygen has been entirely consumed.

The solution of this problem is achieved in the initially described oxygen generator by the present invention, whereby the gas-tight container is constructed as a pressure tank and envelops the cartridge holder so as to leave storage-space capable of accommodating the oxygen content of at least one cartridge without exceeding the permissible tank pressure.

The size of the storage container and its capacity can easily be determined on the basis of known, formulated relationships, if the amount of oxygen released by a cartridge or, where the charge consists of a plurality of cartridges, by all of the cartridges, is known, and if the permissible working pressure of the tank is known. In a pressure tank dimensioned in accordance with the present invention, the cartridge or set of cartridges used can burn completely without the need for a continuous discharge of oxygen. Instead, the oxygen is captured in the storage space under a pressure which increases constantly until the final pressure is reached. It is possible, of course, to consume oxygen also while the cartridges are still burning.

With the oxygen generator of the invention the following advantages are achieved. The processes of producing the oxygen and consuming it are no longer necessarily tied together, and can take place independently of one another. The interruption of the welding, brazing or cutting does not entail any interruption of the burning of the cartridge or cartridges. The severing of the burning portion of the cartridge and re-igniting the unconsumed remainder thus become unnecessary. In like manner it becomes unnecessary to have on hand different kinds of cartridges, since the regulation of the flow of oxygen can be accomplished in some other manner, such as the use of a pressure reducing valve. In this manner a control of the oxygen pressure is possible, so that the burner flame can be better adapted to the requirements of the task, such as flame cutting for example. Due to the presence of the storage chamber, the walls of the tank are at a considerable distance from the cartridge holder and the burning cartridge, so that the tank is heated to a much lesser degree. The endangerment of the work area is thus eliminated, and a less expensive means of protecting the surface of the apparatus becomes possible, such as simple lacquering. The oxygen released by the cartridge has sufficient chance to cool, so that less combustion heat is carried by it and the moisture can be absorbed by the drying agent. The operation of the burner is thus improved—that is, extinction of the flame by moisture is prevented. Due to the storage of the oxygen, the oxygen generator is ready for operation at all times, the stored amount of oxygen being controllable merely by choosing the size of the tank and the number of cartridges to be used. As a rule, the tank will be of a size which will result in a final oxygen pressure of about 20 to 50 atmospheres excess pressure. For such a pressure, relatively small, thin-walled tanks can be used, whose weight is much lighter than that of the high-pressure bottles, and they can easily be transported to and carried about within the construction site. In contrast to the high-pressure bottles, the oxygen generator of the invention can be recharged with cartridges and restored to operation at any time and place. If oxygen is needed very rapidly and in great quantities, the cartridges or stack of cartridges can be ignited at both ends and charged into the tank. Burners of conventional type designed to operate on a working pressure of up to about 2.5 atmospheres gauge pressure in conjunction with a conventional pressure reducing valve can be used with the oxygen generator. Any combustible gas can be used for the flame production, such as for example acetylene, propane, MAPP and hydrogen.

The apparatus thus becomes so light and compact in combination with cartridges for several fillings that it can be carried in busses, aircraft, boats and rescue vehicles even over long distances. This is especially advantageous in remote regions, as for example in the mountains, on isolated farms, and in space travel. The ratio of the transported oxygen to the weight of the tank with its charge becomes optimized. The return transport and the management of empty bottles for refilling are completely eliminated. Neither is it necessary to keep a full or partially full bottle on hand for only occasional use and pay rent on it. Also eliminated is the need to keep a reserve bottle on hand in case the first bottle should run out.

The oxygen generator of the invention is advantageously dimensioned such that the pressure tank is of approximately the same length as the cartridge holder and twice its diameter. In the storage space thus formed, a sufficient amount of oxygen accumulates at a pressure that is not excessive. To achieve a most uniform temperature distribution over the circumference of the tank, it is furthermore proposed that the pressure tank encompass the cartridge holder concentrically at a radial distance therefrom amounting to at least the diameter of the cartridge holder. It is desirable that the cartridge holder be inserted into the pressure tank by means of a pressuretight threaded fastening means so as to combine good resistance to leakage with rapid replaceability. For the purpose of better control of the operating state and the achievement of a constant gas pressure, it is furthermore proposed that the pressure tank be provided with a tank pressure gauge, a pressure reducer, and a working pressure gauge.

Since the cartridges release corrosive components as they burn, it is especially desirable to make the pressure tank out of corrosion-resistant steel or to provide it with an appropriate lining of a heat resistant material such as enamel, polytetrafluoroethylene etc. Plastics are to be preferred on account of their high resistance to impact, there being a relatively great selection available of heat and corrosion resistant plastics for surface coating.

The apparatus of the invention is suitable to special advantage as a reactor for the filling of storage tanks or large gas bottles. In contrast to the apparatus of the state of the art, the apparatus of the invention consists of a pressure tank, so that it is possible to transfer the released oxygen, with some loss of pressure, to another container and to build up a pressure in the latter. It is necessary only to charge an appropriate number of cartridges into the oxygen generator and connect it to a storage tank by means of appropriate tubing. The pressure tank, again, will accommodate the oxygen pressure of at least one cartridge without exceeding the acceptable tank pressure. If the correct pressure in the storage tank should be attained after a period of time before all the cartridges in the oxygen generator have completely burned, the safety valve which is to be provided will respond and blow the excess oxygen off into the open air.

According to an especially advantageous additional embodiment of the oxygen generator of the invention, the latter can be used as a reactor for the continuous production of large amounts of oxygen. This is made possible in accordance with the further invention by the installation of at least one charging lock, known in itself, by means of which additional cartridges can be introduced into the bank without opening the pressure tank and without the loss of the oxygen pressure. Operation over a long period of time is also possible, on the other hand, if at least one magazine is provided in the interior of the tank to contain a large number of cartridges which can be fed one after another into the position in which they can be ignited.

In the drawing, 10 is a gas-tight container similar to those used, for example, as liquid gas bottles or fire extinguishers. The container has an essentially cylindrical shape and has at its upper end a neck with a pressuretight threaded fastening means 11 whereby the upper end of a cartridge holder 12 is joined to the container 10 in a gas-tight manner. Details of a pressure-tight fastening means of this kind are in the state of the art and therefore are not further explained.

The cartridge holder 12 is of an essentially tubular shape and consists of a cylinder segment 13 to which loops 14 are fastened in a spaced relationship, which together with cylinder segment 13 form a circular cross section. At the bottom end, the cartridge holder 12 is closed by a bottom 15 which is welded into the cylinder segment 13 and into the bottom loop 14a. At the upper end the cartridge holder 12 consists of a full cylindrical tube 16 into which a filter 17 is inserted, which consists of a plug of refractory fiber material (glass fibers, asbestos fibers, rock wool). In this manner a chamber 18 is formed in tube 16, which contains a granulated drying material such as silica gel, for example.

A plurality of cartridges 19 are inserted into the cartridge holder, which consist of a combustible material which yields oxygen in the burning state. The bottommost cartridge 19a is represented in the burning state after being ignited at its bottom end, in which state an incandescent zone 19b migrates upwardly. In the area of this incandescence gaseous oxygen is liberated, which is indicated by a jet of gas 20. Since the loops 14–14a leave relatively large openings between them, the oxygen can escape freely from the cartridge holder 12 and accumulate in the storage space 21 surrounding the cartridge 12. It can be seen that the cartridge holder is of approximately the same length as the gastight container 10, while the radial distance "S" corresponds approximately to the diameter of the cartridge holder 12. The loops 14–14a prevent the cartridges from dropping out of the holder 12. At its upper end the cartridge holder 12 has a tank pressure gauge 22 and a pressure reducing valve 23, plus a working pressure gauge 26 and a safety valve 27 of conventional design. The connection for the oxygen hose is marked 24; the outlet pressure can be adjusted by means of the adjusting knob 25 within the conventional limits.

The oxygen released in the area of incandescence 19b is carried, upon withdrawal through the connection 24, through the outer surface of filter 17 into the chamber 18 containing the drying material, and from there to the pressure reducing valve 23. The dust released in the combustion process remains held on the surface of filter 17, and can be removed therefrom, when the cartridge holder 12 is reloaded, by brushing it off or knocking it off.

Carrying handles 28 complete the oxygen generator.

Figure 2:
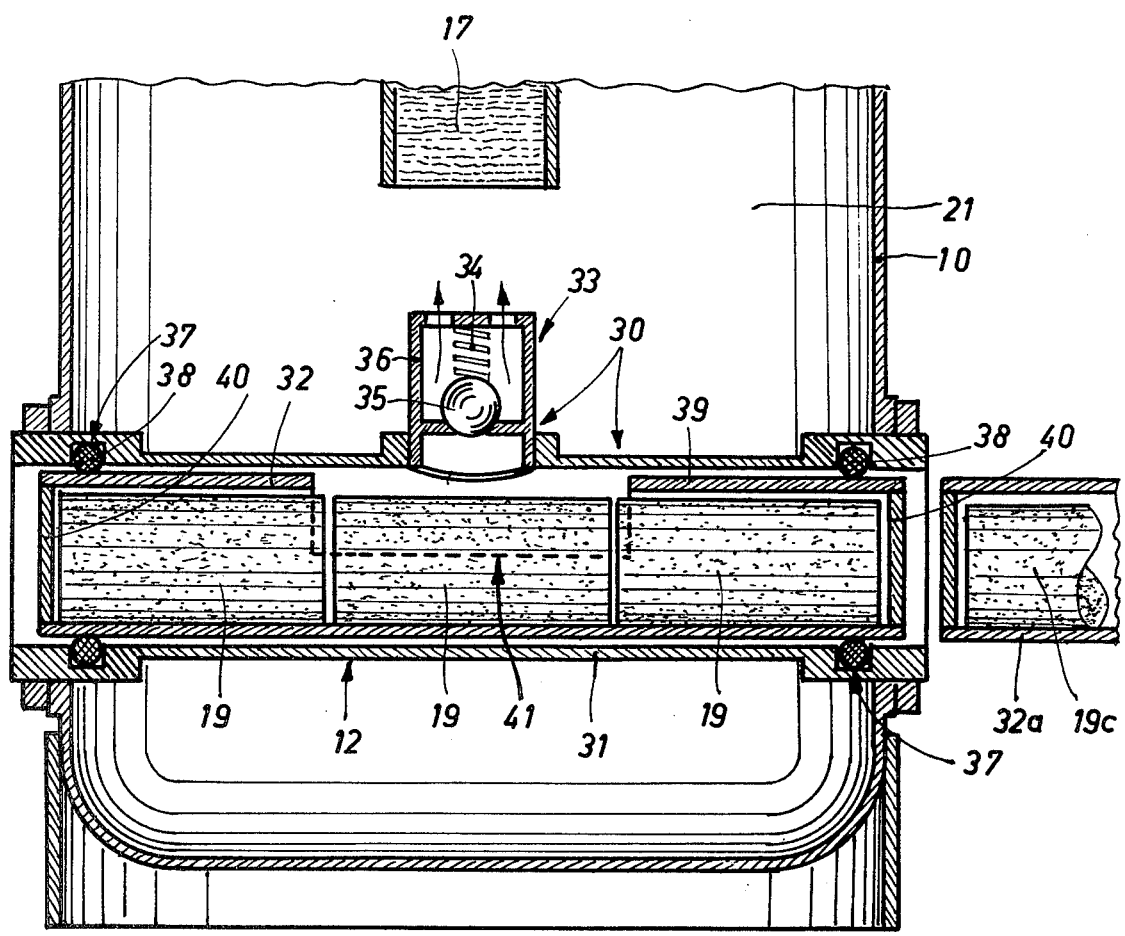

FIG. 2 shows an oxygen generator with charging lock means 30 part of which is the cartridge holder 12. In this embodiment of the invention the cartridge holder consists of an essentially cylindrical tube 31, extending diametrically through the container 10 and being connected at both ends to the said container in a pressure tight manner, preferably exchangeable.

The tube 31 possesses in its center portion on its periphery a valve 33 which opens in a direction to the storage space 21 so that the oxygen liberated may flow in a direction indicated by the two arrows. The valve is preferably a ball valve as shown in the drawing, and the ball is pressed against its seat via a spring 34 extending between the ball 35 and the valve housing 36.

The tube 31 furthermore possesses at or near each end circular grooves 37 which contain sealing rings 38 of a heat resistant and elastic material. A magazine 32 is inserted into the tube 31 and has such outer dimensions and surface properties that it just fits into the tube 31 leaving a radial clearance in respect to the tube 31 but hermetically sealing the interior of the tube 31 against the atmosphere by the sealing rings 38.

The magazine 32 essentially consists of a tubular section 39 which is closed at both ends by circular discs 40. In its center portion the tubular section 39 possesses an opening 41 which extends half the circumference of the tubular section. The length of the opening 41 corresponds to the length of each of the cartridges 19, so that several cartridges may be assembled inside the magazine. The magazine may be pushed through the tube 31 in an axial direction on order to charge or discharge the charging lock 30. At least one of the cartridges 19 is ignited outside the container 10 but inside the magazine 32 and then the magazine is inserted into the tube 31 according to FIG. 2. The oxygen liberated causes an increasing pressure inside the tube 31. When this pressure exceeds the pressure in the storage space 21 and in addition the pressure of the spring 34 the valve opens. The burning of the cartridges continues until all the cartridges are consumed. In order to prevent the magazine from damages due to the heat evolved it may be internally protected by a heat resistant and heat insulating coating, preferably a ceramic liner.

As long as the magazine 32 is in the position shown in FIG. 2 the oxygen pressure on both discs 40 is compensated. As soon as the magazine 32 is pushed out of the container 10, preferably by the magazine 32a shown in a waiting position with a cartridge 19c, the magazine 32 slips off the sealing ring 38 and the pressure inside the tube 31 collapses thereby immediately closing the valve 33. Thus catapulting the magazine by gas pressure is not possible. It may, however, be possible to apply specific fastening means like bolts, latches or the like in order to arrest the magazine inside the tube 31. In addition index pins or the like can be applied between the tube 31 and the magazine 32 in order to prevent the magazine from being turned upside-down by rotation due to accidental manipulation.

The geometric configuration of all the parts 31 to 38 which represent all together the charging lock 30 is designed accordingly so that the function of a charging lock is fulfilled, i.e. that at least one of the passages 35/36 and 38/39 is always closed. In order to keep the opening 41 small enough the ratio of the length of the cartridges 19 and of the magazine 32 should be less than 1:2 or — as shown: 1:3 — or 1:4. The sealing function 38/39 may be replaced by a cap or cover (not shown) being screwed into each end of the tube 31 sealing it hermetically.

What is claimed is:

1. Oxygen generator for heating, welding, cutting and brazing work comprising a gas-tight container and removable cartridge-holder means for the insertion of combustible cartridges yielding oxygen in the burning state, said gas tight container being constructed as a pressure tank and enveloping the cartridge-holder means to leave a storage volume in said tank sufficient to store the collection of oxygen liberated by one or more of said cartridges inserted in the cartridge-holder means, said oxygen generator having a pressure type fastening means connected to the neck of the upper end of said container, the upper end of said cartridge-holder means consisting of a cylindrical tube inserted through and joined to said neck via said pressure type fastening means in a gas tight manner.

2. Oxygen generator of claim 1 wherein the pressure tank has approximately the length of the cartridge holder means and at least 1.5 times the diameter thereof.

3. Oxygen generator of claim 1 wherein the pressure tank envelops the cartridge holder means concentrically with a radial spacing distance corresponding at least to the diameter of the cartridge holder.

4. Oxygen generator of claim 1 wherein the pressure tank is provided with tank pressure gauge means, pressure reducing valve means, working pressure gauge means and safety valve means.

5. Oxygen generator of claim 1 wherein the cylindrical tube forming the upper end of the cartridge holder means forms a chamber containing filter means and drying material, said chamber means being the duct means for conducting the oxygen released.

* * * * *